(12) United States Patent
Klein (10) Patent No.: US 9,190,058 B2
(45) Date of Patent: Nov. 17, 2015

(54) USING VISUAL CUES TO DISAMBIGUATE SPEECH INPUTS

(71) Applicant: Microsoft Corporation, Redmond, WA (US)

(72) Inventor: Christian Klein, Duvall, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 327 days.

(21) Appl. No.: 13/750,674

(22) Filed: Jan. 25, 2013

(65) Prior Publication Data

US 2014/0214415 A1    Jul. 31, 2014

(51) Int. Cl.

| | | |
|---|---|---|
| *G10L 15/00* | (2013.01) | |
| *G10L 17/00* | (2013.01) | |
| *G10L 21/00* | (2013.01) | |
| *G10L 25/00* | (2013.01) | |
| *G10L 15/22* | (2006.01) | |
| *G06F 3/16* | (2006.01) | |
| *G06F 3/01* | (2006.01) | |
| *G06F 3/03* | (2006.01) | |
| *G10L 15/24* | (2013.01) | |

(52) U.S. Cl.
CPC ............... *G10L 15/22* (2013.01); *G06F 3/017* (2013.01); *G06F 3/0304* (2013.01); *G06F 3/167* (2013.01); *G10L 15/24* (2013.01); *G06F 2203/0381* (2013.01); *G10L 2015/223* (2013.01)

(58) Field of Classification Search
USPC .................................. 704/231–257, 270–275
See application file for complete search history.

(56) References Cited

U.S. PATENT DOCUMENTS

| 4,087,632 A | 5/1978 | Hafer |
|---|---|---|
| 4,769,845 A | 9/1988 | Nakamura |

(Continued)

FOREIGN PATENT DOCUMENTS

| WO | 02/063599 A1 | 8/2002 |
|---|---|---|
| WO | 2006/128248 A1 | 12/2006 |
| WO | 2010/147600 A2 | 12/2010 |

OTHER PUBLICATIONS

Liang, et al., "Speaker Independent Audio-Visual Continuous Speech Recognition", Retrieved at <<http://ieeexplore.ieee.org/stamp/stamp.jsp?tp=&arnumber=1035365>>, Proceedings of IEEE International Conference on Multimedia and Expo, Nov. 7, 2002, pp. 25-28.

Luettin, et al., "Speechreading Using Shape and Intensity Information", Retrieved at <<http://ieeexplore.ieee.org/stamp/stamp.jsp?tp=&arnumber=607024>>, Proceedings of Fourth International Conference on Spoken Language, Oct. 3, 1996, pp. 58-61.

(Continued)

*Primary Examiner* — Jesse Pullias
(74) *Attorney, Agent, or Firm* — Aaron Chatterjee; Judy Yee; Micky Minhas (57) ABSTRACT

Embodiments related to recognizing speech inputs are disclosed. One disclosed embodiment provides a method for recognizing a speech input including receiving depth information of a physical space from a depth camera, determining an identity of a user in the physical space based on the depth information, receiving audio information from one or more microphones, and determining a speech input from the audio input. If the speech input comprises an ambiguous term, the ambiguous term in the speech input is compared to one or more of depth image data received from the depth image sensor and digital content consumption information for the user to identify an unambiguous term corresponding to the ambiguous term. After identifying the unambiguous term, an action is taken on the computing device based on the speech input and the unambiguous term.

19 Claims, 6 Drawing Sheets

(56) References Cited

U.S. PATENT DOCUMENTS

| | | | |
|---|---|---|---|
| 5,774,591 | A | 6/1998 | Black et al. |
| 6,185,529 | B1 | 2/2001 | Chen et al. |
| 7,069,215 | B1* | 6/2006 | Bangalore et al. ............ 704/255 |
| 7,321,854 | B2 | 1/2008 | Sharma et al. |
| 7,409,344 | B2 | 8/2008 | Gurram et al. |
| 7,533,014 | B2* | 5/2009 | Mao ................................ 704/9 |
| 2002/0116197 | A1 | 8/2002 | Erten |
| 2002/0135618 | A1* | 9/2002 | Maes et al. .................... 345/767 |
| 2002/0178344 | A1* | 11/2002 | Bourguet et al. ................ 712/1 |
| 2003/0018475 | A1 | 1/2003 | Basu et al. |
| 2004/0046736 | A1 | 3/2004 | Pryor et al. |
| 2004/0193413 | A1 | 9/2004 | Wilson et al. |
| 2006/0136221 | A1 | 6/2006 | James et al. |
| 2007/0136071 | A1 | 6/2007 | Lee et al. |
| 2009/0138805 | A1 | 5/2009 | Hildreth |
| 2010/0070268 | A1 | 3/2010 | Sung |
| 2010/0169098 | A1 | 7/2010 | Patch |
| 2010/0241431 | A1 | 9/2010 | Weng et al. |
| 2010/0315329 | A1 | 12/2010 | Previc et al. |
| 2011/0257971 | A1 | 10/2011 | Morrison |
| 2011/0311144 | A1 | 12/2011 | Tardif |
| 2012/0035932 | A1* | 2/2012 | Jitkoff et al. .................. 704/254 |
| 2013/0063256 | A1 | 3/2013 | Tartz et al. |
| 2013/0144616 | A1 | 6/2013 | Bangalore |
| 2013/0144629 | A1 | 6/2013 | Johnston et al. |
| 2013/0201314 | A1* | 8/2013 | Friedlander et al. ............ 348/77 |
| 2013/0304479 | A1 | 11/2013 | Teller et al. |

OTHER PUBLICATIONS

Roy, et al., "Visual Context Driven Semantic Priming of Speech Recognition and Understanding", Retrieved at <<http://www.media.mit.edu/cogmac/publications/fuse03a.pdf, Apr. 26, 2005, pp. 25.

IPEA European Patent Office, Written Opinion of the IPEA Issued in Application No. PCT/US2014/012409, Dec. 3, 2014, WIPO, 7 pages.

Fransen, et al., "Using Vision, Acoustics, and Natural Language for Disambiguation", Retrieved at <<http://www.cs.cmu.edu/~mrmarge/NRL.HRI07.pdf>>, In Human Robot Interaction, Mar. 8, 2007, pp. 8.

Niyogi, et al., "Feature Based Representation for Audio-Visual Speech Recognition", Retrieved at <<http://people.cs.uchicago.edu/~niyogi/papersps/NPZaudvis.pdf>>, In Auditory-Visual Speech Processing, Aug. 7, 1999, pp. 6.

Bali, Kalika., "F0 cues for the discourse functions of "hā" in Hindi", Retrieved at <<http://research.microsoft.com/pubs/143630/haaninterspeech2009.pdf>>, 10th Annual Conference of the International Speech Communication Association, Sep. 6, 2009, pp. 4.

European Patent Office, International Search Report & Written Opinion for PCT Application No. PCT/US2014/012409, May 13, 2014, 11 pages.

European Patent Office, International Search Report & Written Opinion of PCT/US2013/065793, Netherlands, Dec. 18, 2013, 10 pages.

IPEA European Patent Office, International Preliminary Report on Patentability Issued in Application No. PCT/US2014/012409, Apr. 30, 2015, WIPO, 8 pages.

\* cited by examiner

USING VISUAL CUES TO DISAMBIGUATE SPEECH INPUTS

BACKGROUND

Computer speech recognition systems may receive ambiguous speech commands. Sources of ambiguity may include imperfect speech recognition technology, inconsistent usage of grammar, and statements that may be ambiguous in nature (e.g., the term "bank" may refer to a river bank or a financial institution). In light of such issues, current speech recognition systems may address ambiguities by asking a speaker to repeat his or her request or by guessing and allowing the speaker to retroactively correct any errors.

SUMMARY

Embodiments are disclosed that relate to disambiguating speech inputs. For example, one disclosed embodiment provides a method for recognizing a speech input, the method comprising receiving depth information of a physical space from a depth camera, determining an identity of a user in the physical space based on the depth information, receiving audio information from one or more microphones, and determining a speech input from the audio input. If the speech input comprises an ambiguous term, the ambiguous term in the speech input is compared to one or more of depth image data received from the depth image sensor and digital content consumption information for the user to identify an unambiguous term corresponding to the ambiguous term. After identifying the unambiguous term, an action is taken on the computing device based on the speech input and the unambiguous term.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Ambiguous terms in speech inputs may present difficulties to a speech recognition system. As mentioned above, one potential method of addressing such ambiguities may be to retroactively ask a speaker to clarify an ambiguous term. However, such clarification processes may detract from natural, human-to-human style interaction that frequently relies on visual cues in addition to speech.

Accordingly, embodiments are disclosed herein that relate to the disambiguation of ambiguous terms using one or more visual cues. The visual cues may be identified, for example, based on image information collected by a capture device, such as a depth camera. The visual cues may include implicit cues, such as the identity of each user (both active and non-active with respect to computing system interactions) present in a physical space, and/or explicit user cues, such as intentional gestures performed by the speaker. Further, digital content consumption information stored for users may be analyzed to help disambiguating speech inputs.

Figure 1:
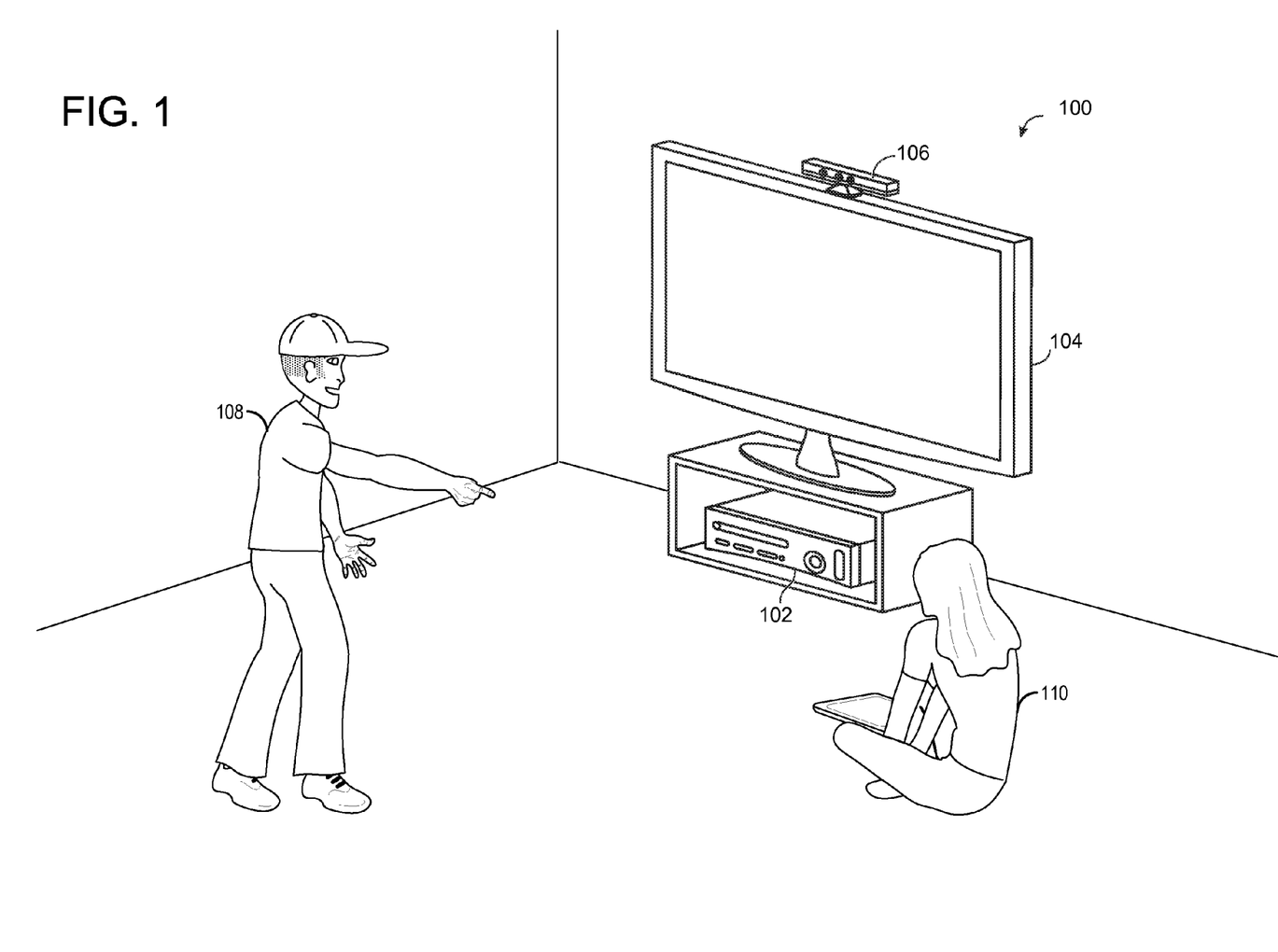
FIGS. 1-3 show schematic examples of speech recognition environments according to embodiments of the disclosure.

FIG. 1 shows an example embodiment of a speech recognition environment 100. The environment 100 comprises a computing system 102 in the form of an entertainment console that may be used to play a variety of different games, play one or more different media types, and/or control or manipulate non-game applications and/or operating systems. FIG. 1 also shows a display device 104 such as a television or a computer monitor, which may be used to present media content, game visuals, non-game computing content, etc., to users.

A user 108 is illustrated as interacting with the computing system 102 via speech input to control one or more aspects of the computing system 102. As a non-limiting example, the user may be controlling playback of a video content item displayed on the display. The user's speech inputs may be received via a sensor system 106 comprising one or more microphones, such as a directional microphone array. Sensor system 106 also may comprise one or more other suitable sensors, including but not limited to a two dimensional image sensor (e.g. an RGB or grayscale sensor), a depth image sensor (e.g. a time of flight or structured light depth sensor), a stereo camera system, and/or any other suitable sensors. Such a sensor system may allow the user to make gesture-based inputs in addition to speech inputs. While described herein in the context of a home entertainment console, it will be understood that any other suitable computing device may be used. The depth image sensor of sensor system 106 may be used to recognize, analyze, and/or track one or more persons and/or objects within a physical space, such as user 108 and another user 110.

In order to image objects within the physical space, the depth image sensor may utilize an infrared light source to emit infrared light that is reflected off objects in the physical space and received by the depth camera. Based on the received infrared light, a depth map of the physical space may be constructed. Sensor system 106 may output the depth map derived from the infrared light to computing system 102, where it may be used to recognize objects in the physical space, monitor movement of one or more users, perform gesture recognition, etc.

Computing system 102 further may be configured to recognize one or more terms spoken by users in the speech recognition environment 100. More particularly, if one of user 108 or user 110 is speaking, audio information received by computing system 102 (e.g. via one or more microphones incorporated into sensor system 106 and/or located external to sensor system 106) may be analyzed to recognize one or more of the words spoken by the user. Example speech recognition technologies are discussed in more detail with reference to FIG. 4.

Computing system 102 also may be configured to communicate with one or more remote computing devices not shown in FIG. 1. For example, computing system 102 may receive video content directly from a broadcaster, third party media provision service, or other content provider. Computing system 102 may also communicate with one or more remote services via the Internet or another network, for example, in order to analyze the received audio and/or image data, perform the speech recognition, etc. While the embodiment depicted in FIG. 1 shows computing system 102, display device 104, and sensor system 106 as separate elements, in some embodiments one or more of the elements may be integrated into a common device.

As mentioned above, speech input received by computing system 102 may be augmented with one or more visual cues detected by sensor system 106 to help disambiguate potentially ambiguous speech inputs. For example, FIG. 1 shows a scenario in which a user identity may be utilized to augment speech input. Sensor system 106 obtains information that may be used by computing system 102 to determine the identity of users 108 and 110 and/or other people present in the physical space. Various mechanisms may be utilized to identify the users, including but not limited to skeletal modeling, facial recognition, clothing color tracking, etc. Further, user identity also may be determined based at least on part via voice recognition from audio information received from one or more microphones (e.g. via voice pattern recognition and/or directional microphone array beam angle data in combination with image data).

Sensor system 106 also may be used to detect and track postures and movements of users in the use environment. Such tracking information may be used, for example, to detect various contextual clues regarding whether a speaker is making a speech input to the computing system 102, or is talking to another user. As a more specific example, if a user is not facing the computing system 102 when speaking, it may be determined that the user is not speaking to the computing system 102. Likewise, where multiple users are visible by the sensor system, whether a user is facing the computing system 102 may be used as information to help identify which person made a speech input.

Gestures made by identified users also may provide contextual clues related to ambiguous spoken words. For example, if user 108 of FIG. 1 states "include her in the next game" while pointing at user 110, the ambiguous term "her" may be disambiguated by determining that user 108 is indicating user 110 via gesture, in combination with the identity of user 110. As a result, computing system 102 may invite user 110 to join in the next game played on computing system 102.

In another example, digital content consumption information may be stored for identified users at a user's election. Such information may comprise any suitable information regarding the user's past consumption of digital content, such as audio, video, social network, and other content. Such information also may include or otherwise relate to user preference information (e.g. known affinity to brands and/or content), and/or settings or profile information. The stored digital content consumption information for a user thus may be analyzed to help disambiguate ambiguous speech inputs made by that user.

As an example scenario, if user 108 says "play Batman," the speech input may be ambiguous in that multiple movies, shows and games may share the term "Batman" in the title. In this case, computing system 102 may use digital content consumption information to identify the particular Batman content to which user 108 is referring, for example, by determining from the digital content consumption information that user 108 has recently purchased the newest Batman movie. In this case, computing system 102 may determine that the user 108 intends to watch that movie. Likewise, if the user has recently watched episodes of a Batman series, a next unviewed episode in the series may be played.

In yet another example, user 108 may say "send game invite to Bob." The digital content consumption information (e.g. social networking information) may then be analyzed to determine which friend of user 108 named Bob is likely to play games with user 108 (e.g. whether any friends with this name or related names have played games with user 108 recently), and computing system 102 may then send a game invitation to that person.

Figure 2:
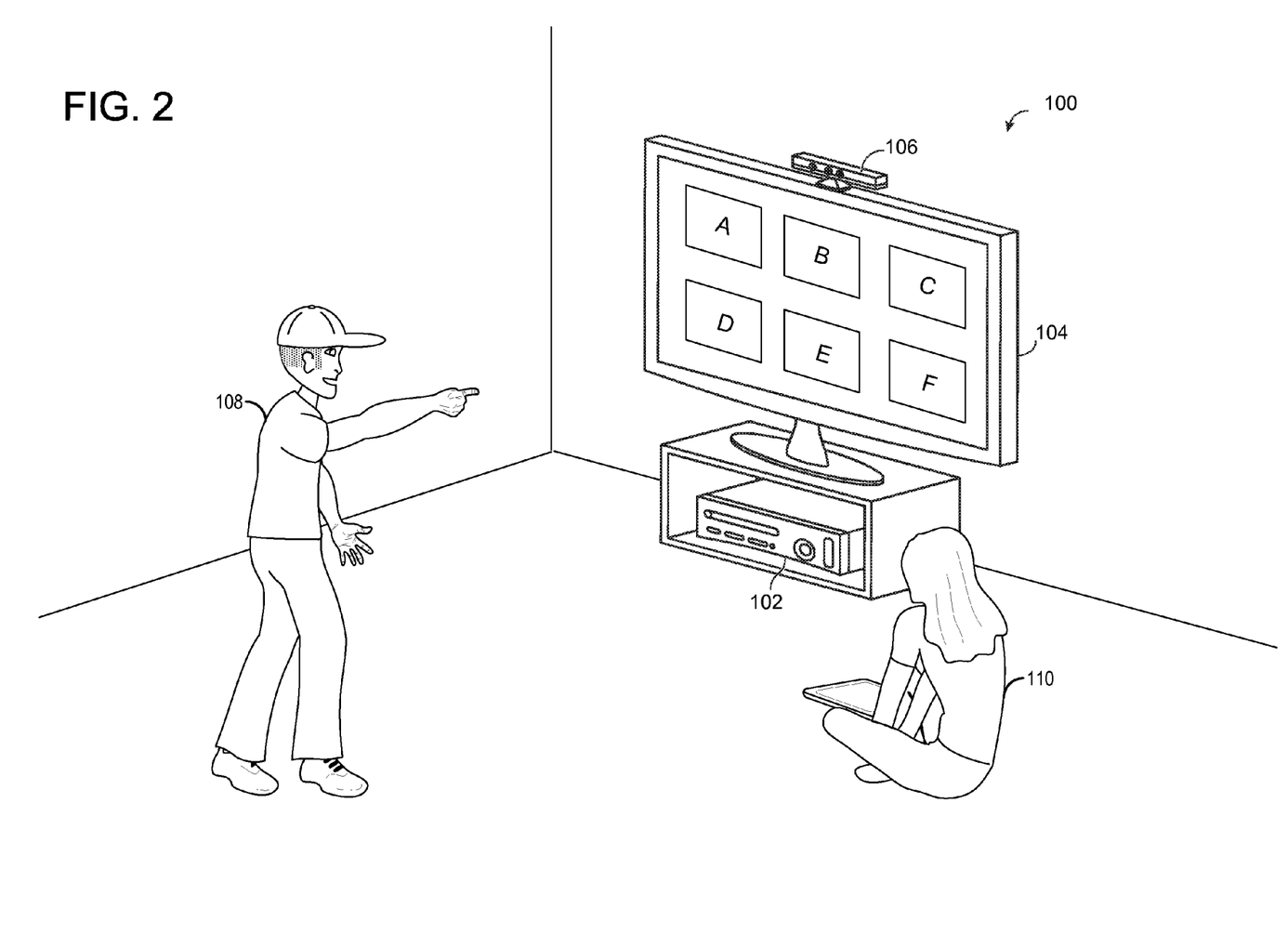

FIG. 2 shows another example of visual cues that may be used to disambiguate ambiguous speech terms. In the scenario illustrated in FIG. 2, user 108 is pointing to a user interface element displayed on display device 104. If user 108 issues a speech input that includes an ambiguous term, such as "play that show," the ambiguous term may be identified by detecting which user interface element user 108 is pointing toward from image data. For example, based on information from sensor system 106, computing system 102 may determine that user 108 is pointing to a user interface menu element representing show E, and thus send show E to display device 104.

Figure 3:
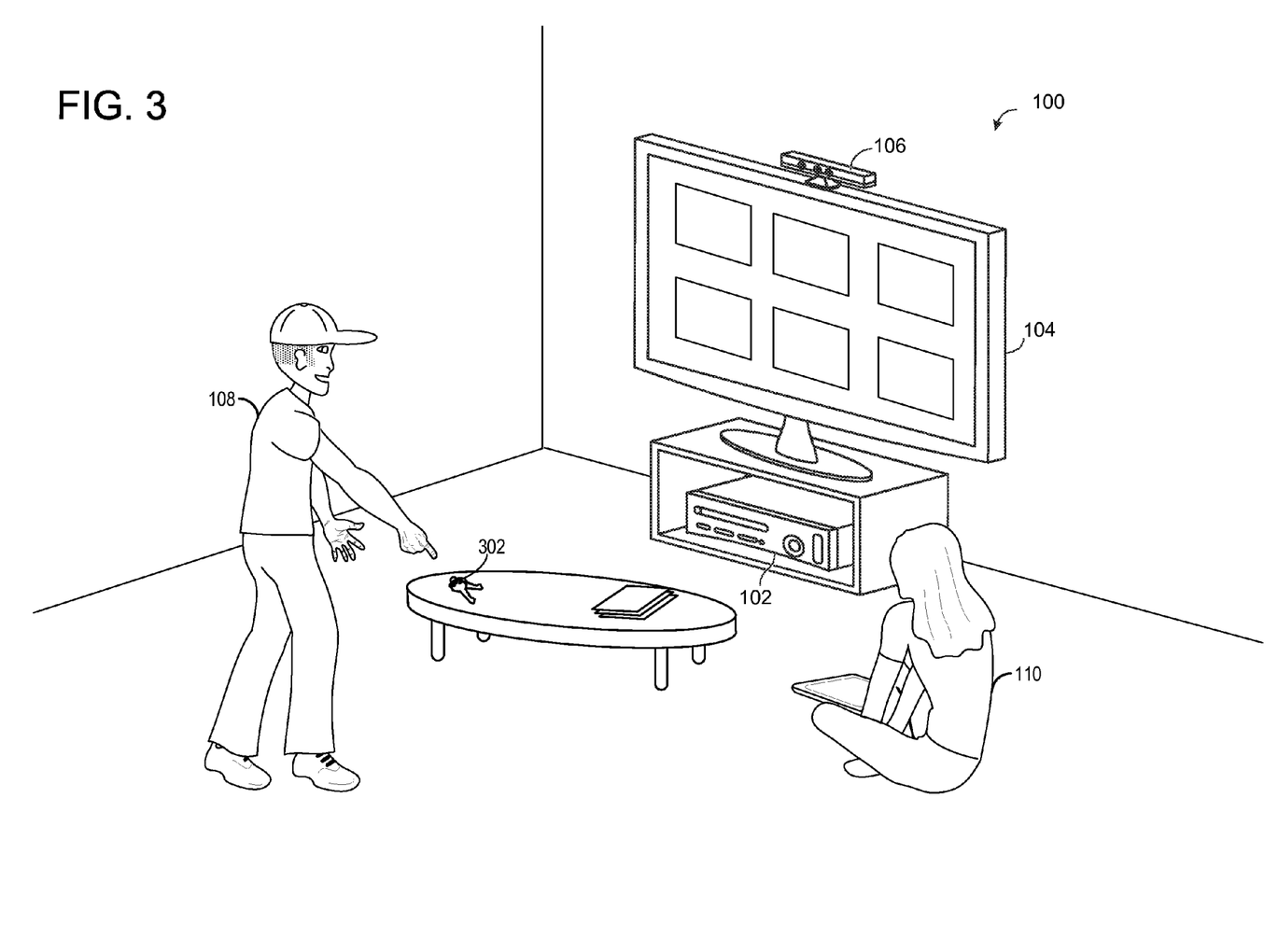

Other types of contextual information likewise may be determined from the information received from sensor system 106. For example, in some embodiments, an emotional state of user 108 when speaking may be determined from facial and/or body features, postures, gestures, etc., of user 108 detected via depth information. As yet another example, objects in the imaged physical space may be identified and used to distinguish ambiguous words. FIG. 3 shows a scenario where user 108 is pointing to a set of keys 302. If user 108 says "take a picture of that," while pointing to keys 302, computing system 102 may determine that user 108 intends a picture of keys 302 be taken. Therefore, in the case of an ambiguous term present in speech input, depth image data of the physical space may be used to detect objects, actions, user identity, etc., that may provide context to help determine an unambiguous term correlating to the ambiguous term.

Figure 4:
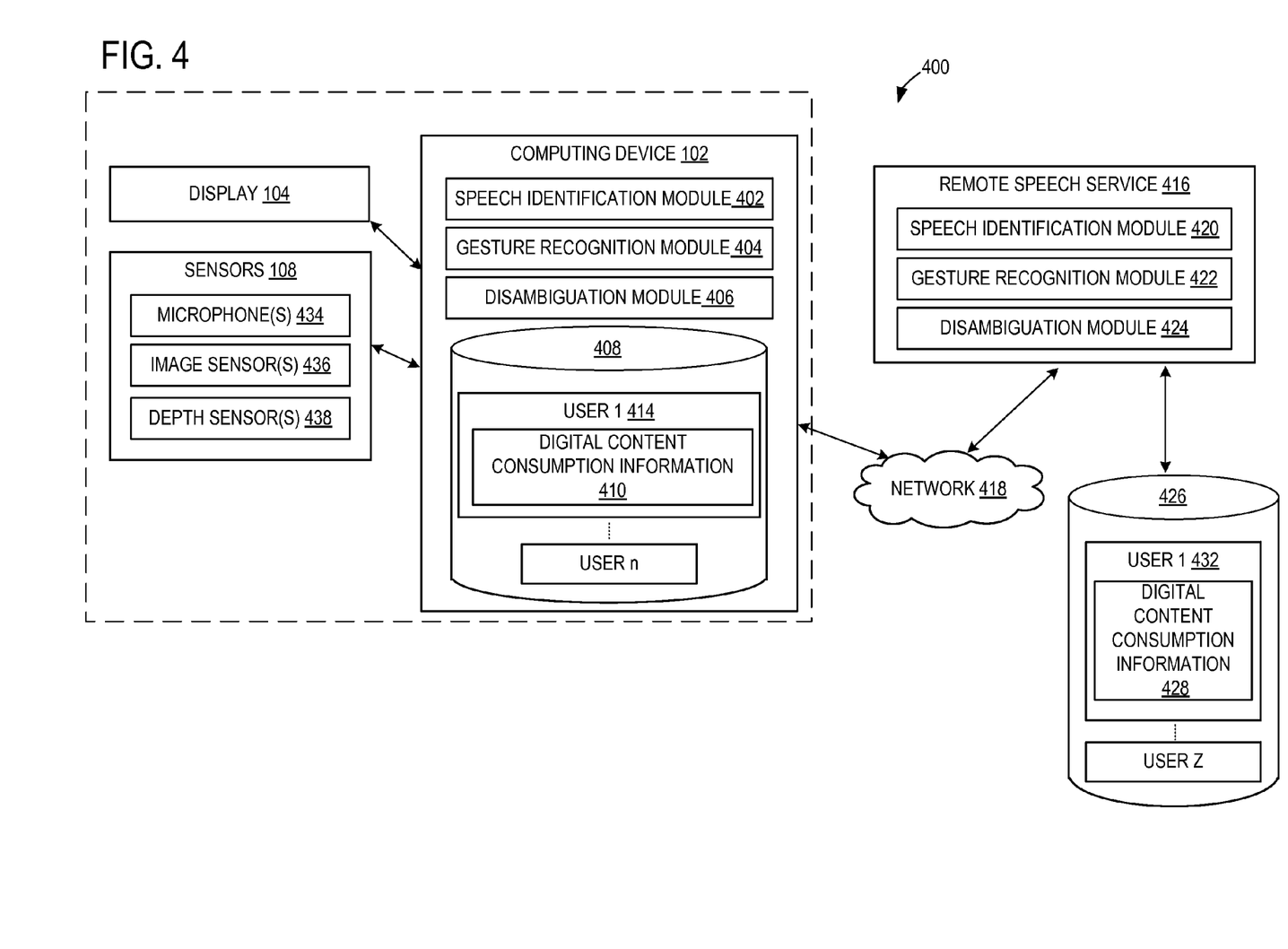
FIG. 4 shows a block diagram of an embodiment of a speech input use environment.

FIG. 4 shows a block diagram of an embodiment of a speech input environment 400 that includes computing system 102. The computing system 102 includes various modules utilized in the identification and interpretation of speech and other commands. Such modules may include, but are not limited to, a speech identification module 402 configured to identify recognized speech commands from a user's speech inputs, a gesture recognition module 404 configured to recognize user gestures, and a disambiguation module 406 configured to disambiguate ambiguous inputs. The computing system 102 further may comprise storage 408. The storage 408 may be used to store various information, such as preferences data and digital content consumption information, for each of one or more users. It will be understood that this information may be stored as a part of a user profile 414 for each user of the computing system 102.

In some embodiments, speech recognition, gesture recognition, and/or disambiguation processes may be partially or fully performed at a location remote from the computing system 102. FIG. 4 illustrates a remote speech service 416 accessible to the computing system 102 via a network 418. The remote speech service 416 is illustrated as comprising a speech identification module 420, a gesture recognition module 422, and a disambiguation module 424, such that the computing system 102 may send raw speech and/or gesture inputs for the determination of recognized speech segments and/or gestures, and/or may send recognized speech segments along with gesture data for disambiguation of ambiguous terms. The remote speech service 416 is also depicted as being in communication with storage 426 in which digital content consumption information 428 may be stored. Again, it will be understood that such information may be separately stored for each user of the service, for example, within user profiles 432 for the users.

As mentioned above, the computing system 102 is configured to receive input via various sensors, such as via sensor system 106. In FIG. 4, sensor system 106 is depicted as comprising one or more microphones 434, one or more image sensors 436 (e.g. two-dimensional RGB sensor(s)), and one or more depth sensors 438. It will be understood that these sensors are described for the purpose of example, and that any other suitable sensors may be used.

Figure 5:
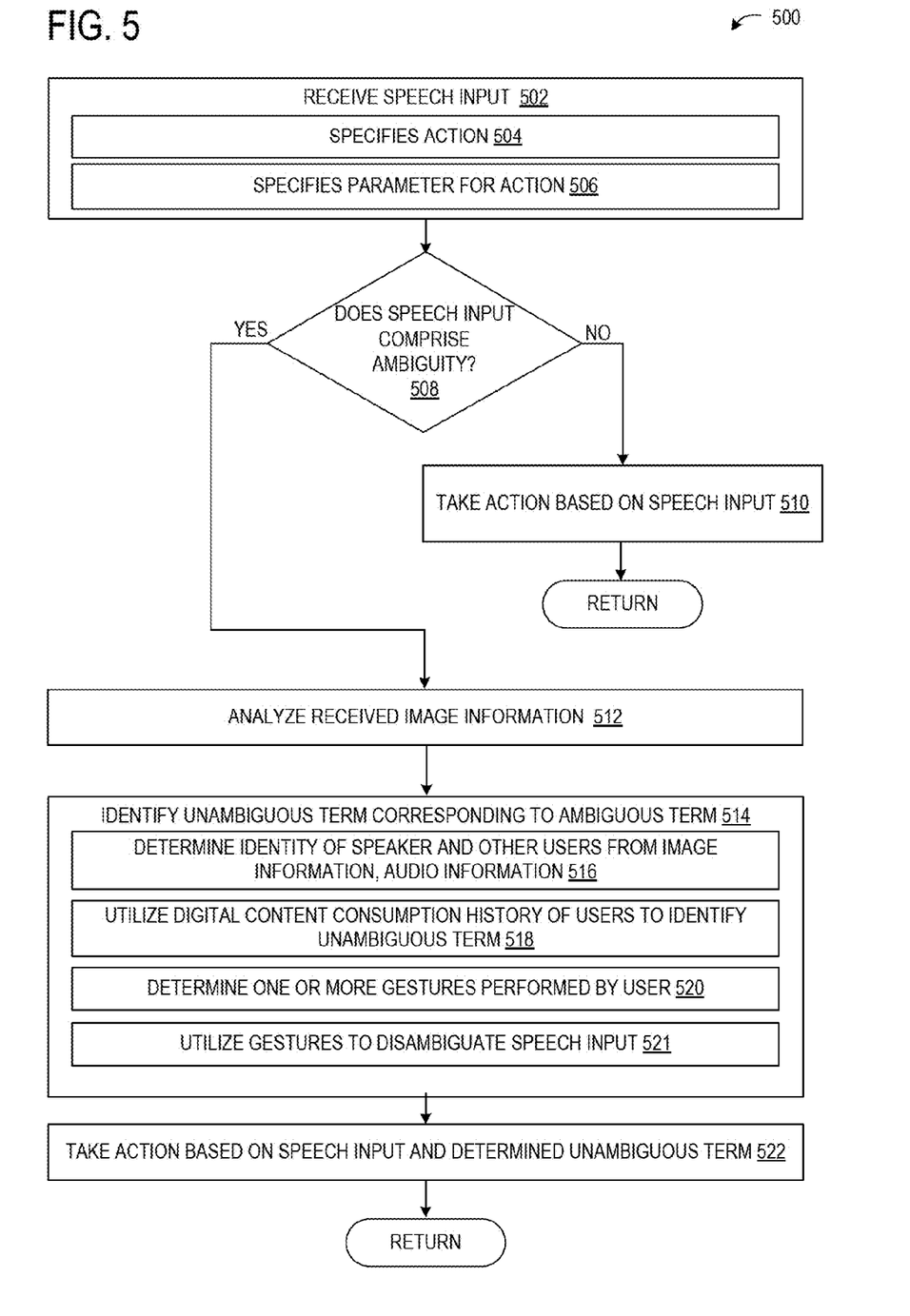
FIG. 5 shows a flow chart illustrating an embodiment of a method for disambiguating speech input.

FIG. 5 shows a flow diagram depicting an embodiment of a method 500 for disambiguating ambiguous speech inputs. Method 500 may be performed by computing system 102, by a computing system executing remote speech service 416, and/or on any other suitable computing system. Method 500 comprises, at 502, receiving a speech input. The speech input may specify an action to be taken on the computing system, as shown at 504. The speech input further may comprise a parameter modifying the action, as indicated at 506. Either of these terms may be ambiguous. For example, where a user points to another user and says "add her in the next game," the parameter for the action "add" is ambiguous. Likewise, where a user states "faster" after previously making a swiping gesture to fast forward through a video content, the action to which to apply the parameter "faster" may be ambiguous.

Thus, at 510, method 500 comprises determining whether the speech input includes an ambiguity. As mentioned above, various forms of ambiguity may be encountered. For example, the speech term may be ambiguous in that it sounds similar to other recognized speech commands. As another example, the speech term may be recognized, but may include a term that is ambiguous in nature, such as indefinite pronouns (e.g. her, him, they, that, etc.), terms that may represent multiple different things (e.g. play "Batman,", wherein there are multiple movies and television shows with the term "Batman" in the title), terms that are relative in nature ("the person next to me"), or that are otherwise unclear.

If the speech input does not include an ambiguous term, method 500 proceeds to 510 to take an action on the computing device based on the speech input. On the other hand, if the speech input does include an ambiguous term, method 500 proceeds to 512 to analyze received image information (e.g. depth information and/or two-dimensional information) from an image sensor (e.g. depth sensor and/or two-dimensional image sensor). Analysis of the image data may then be used to identify an unambiguous term corresponding to the ambiguous term, as shown at 514, via one or more implicit and/or explicit visual cues identified in the image data.

Image information may be used in any suitable manner to help identify an unambiguous term corresponding to the ambiguous speech term. For example, as indicated at 516, image data may be used to determine the identity of the speaker and/or other users present in the physical space monitored by the sensor system. This may allow the specific identity of a person referred to in a relative or other indefinite way to be determined. It will be understood that, in some embodiments, the computing system may be configured to continuously identify and track users whether or not any ambiguous speech inputs are made.

Further, as indicated at 518, digital content consumption information may be analyzed to help identify the unambiguous term. Such digital content consumption information may include historical, social, and/or preference data stored for each user at the user's option. From this information, the computing device may identify recently acquired and/or consumed media, contacts in a social network, and other such information that may help to identify the unambiguous term. It will be understood that the digital content consumption information of other people present in a physical space than the speaker also may be analyzed for contextual information to help disambiguate an ambiguous term.

Identifying the unambiguous term may also include, at 520, determining one or more gestures performed by the user, and utilizing contextual clues provided by the one or more gestures to identify the unambiguous term (e.g. by determining the identity of a person, object, user interface element, etc. that a speaker is pointing at in connection with the speech input). The gestures may be identified in any suitable manner, such as from depth information received from the depth sensor and/or from two-dimensional image data received from a two-dimensional image sensor.

In some instances a gesture may be proactive in that the gesture is recognized by the input system as representing and preceding a particular command. Such gestures may be performed prior to the user making the speech input, and may be performed intentionally by the user to set a context for what may otherwise be an ambiguous speech command. Examples of such inputs include, but are not limited to, waving to draw the attention of the system before speaking, setting a list in motion or fast forwarding a movie with a swipe gesture (followed by issuing a speech command such as "faster"), etc.

In other instances, a gesture may be a simultaneous gesture performed at the same time the speech input is spoken, or a reactive gesture performed after speech input. A simultaneous gesture may include, for example, pointing at a particular object, person, or user interface element while speaking. A reactive gesture may clarify an ambiguous speech command after the user has issued the speech command, such as a user nodding his or her head to confirm a speech input that was recognized with low confidence.

At 524, method 500 includes taking an action on the computing device based on the speech input and the unambiguous term. The action may be defined by the speech input, and may include a command performed by the computing device (such as starting a game or move, adjusting the volume of the display device, etc.). In another example, the action may include displaying a representation of the speech input on the display device.

In some embodiments, the methods and processes described above may be tied to a computing system of one or more computing devices. In particular, such methods and processes may be implemented as a computer-application program or service, an application-programming interface (API), a library, and/or other computer-program product.

Figure 6:
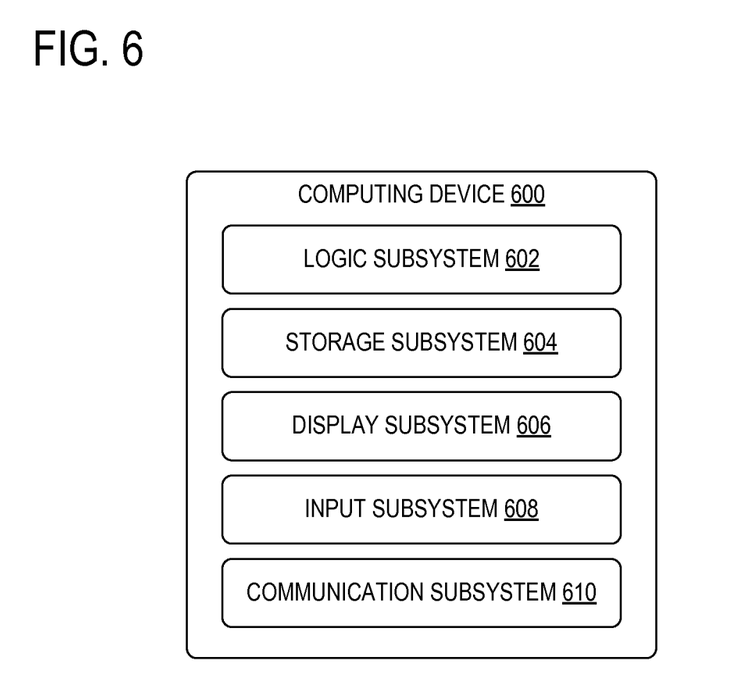
FIG. 6 shows a block diagram of an embodiment of a computing system.

FIG. 6 schematically shows a non-limiting embodiment of a computing system 600 that can enact one or more of the methods and processes described above. Computing system 600 is shown in simplified form. It will be understood that virtually any computer architecture may be used without departing from the scope of this disclosure. In different embodiments, computing system 600 may take the form of a mainframe computer, server computer, desktop computer, laptop computer, tablet computer, home-entertainment computer, network computing device, gaming device, mobile computing device, mobile communication device (e.g., smart phone), etc.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 604 includes one or more physical devices configured to hold data and/or instructions executable by the logic subsystem to implement the methods and processes described herein. When such methods and processes are implemented, the state of storage subsystem 604 may be transformed—e.g., to hold different data.

Storage subsystem 604 may include removable media and/or built-in devices. Storage subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, in some embodiments, aspects of the instructions described herein may be propagated by a pure signal (e.g., an electromagnetic signal, an optical signal, etc.) via a communications medium, as opposed to a storage medium. Furthermore, data and/or other forms of information pertaining to the present disclosure may be propagated by a pure signal.

In some embodiments, aspects of logic subsystem 602 and of storage subsystem 604 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The term "module" may be used to describe an aspect of computing system 600 implemented to perform a particular function. In some cases, a module may be instantiated via logic subsystem 602 executing instructions held by storage subsystem 604. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage subsystem, and thus transform the state of the storage subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method for recognizing a speech input, the method comprising:
    receiving image information of a physical space from a one or more cameras;
    determining an identity of a user in the physical space based on the image information;
    receiving audio information from one or more microphones;

determining a speech input from the audio input;
if the speech input comprises an ambiguous term, then comparing the ambiguous term in the speech input to digital content consumption information for the user to identify an unambiguous term corresponding to the ambiguous term, the digital content consumption information comprising social network information obtained from a remote service, the social network information including contacts from a social network, and wherein identifying the unambiguous term comprises identifying another user from the social network information; and
after identifying the unambiguous term, taking an action on the computing device based on the speech input and the unambiguous term.

2. The method of claim 1, wherein the digital content consumption information for the user further comprises past content consumption information for the user, and wherein identifying the unambiguous term comprises identifying a content item referred to by the ambiguous term from the historical content consumption information.

3. The method of claim 1, further comprising identifying one or more gestures performed by the user via the image information, and utilizing the one or more gestures to identify the unambiguous term.

4. The method of claim 3, wherein the one or more gestures indicate another person referred to in the ambiguous speech input.

5. The method of claim 4, further comprising identifying the other person indicated by the one or more gestures.

6. The method of claim 3, wherein the one or more gestures indicate an object referred to in the ambiguous speech input.

7. The method of claim 1, wherein the identity of the user is further determined based on information received from the one or more microphones.

8. The method of claim 1, further comprising identifying one or more other persons in the physical environment.

9. The method of claim 1, wherein the digital content consumption information further comprises user preference information based on past digital content consumption.

10. On a computing device, a method for recognizing speech of a user, comprising:
receiving depth information of a physical space from a depth camera;
identifying one or more gestures performed by the user based on the depth information;
receiving audio information from one or more microphones;
determining a speech input from the audio input;
if the speech input comprises an ambiguous term, then utilizing one or more of the one or more gestures and social network information obtained from a remote service to identify an unambiguous term corresponding to the ambiguous term, the social network information including contacts from a social network, and wherein identifying the unambiguous term comprises identifying another user from the social network information; and
after identifying the unambiguous term, taking an action on the computing device based on the speech input and the unambiguous term.

11. The method of claim 10, wherein the speech input comprises a command, and wherein the one or more gestures comprise the user pointing to an object in the physical space such that the unambiguous term is an identity of the object.

12. The method of claim 10, wherein the speech input comprises a command, and wherein the one or more gestures comprise the user pointing to another user in the physical space such that the unambiguous term is an identity of the other user.

13. The method of claim 10, wherein the speech input comprises a command, and wherein the one or more gestures comprise the user pointing to a user interface element displayed on a display device such that the unambiguous term is a selected user interface element at which the user is pointing.

14. The method of claim 10, wherein the one or more gestures include a proactive gesture performed prior to the user speaking the speech input to indicate a context of the speech input.

15. The method of claim 10, wherein the one or more gestures include a reactive gesture performed after the user makes the speech input.

16. The method of claim 10, further comprising additionally utilizing digital content consumption information of the user to disambiguate the speech input.

17. A storage device comprising instructions executable by a logic subsystem to:
receive depth information of a physical space from a depth camera;
determine an identity of a user in the physical space based on the depth information;
identify one or more gestures performed by the user based on the depth information;
receive audio information from one or more microphones;
determine a speech input from the audio input;
if the speech input comprises an ambiguous term, then utilize one or more of digital content consumption information for the user and the one or more gestures to identify an unambiguous term corresponding to the ambiguous term, the digital content consumption information including social network information obtained from a remote service, the social network information including contacts from a social network, and wherein identifying the unambiguous term comprises identifying another user from the social network information; and
after identifying the unambiguous term, take an action on the computing device based on the speech input and the unambiguous term.

18. The storage device of claim 17, wherein the instructions are executable to determine that the one or more gestures indicate one or more of another person in the physical space and an object in the physical space.

19. The storage device of claim 17, wherein the digital content information further comprises one or more of historical content consumption data and user preference data.

* * * * *